US010878388B2

(12) United States Patent
Wang et al.

(10) Patent No.: US 10,878,388 B2
(45) Date of Patent: Dec. 29, 2020

(54) SYSTEMS AND METHODS FOR ARTIFICIAL-INTELLIGENCE-BASED AUTOMATED SURFACE INSPECTION

(71) Applicant: VISIONX, LLC, Cupertino, CA (US)

(72) Inventors: Dongyan Wang, Santa Clara, CA (US); Haisong Gu, Cupertino, CA (US); Mingze Xu, Plano, TX (US); Kuangyuan Sun, Santa Clara, CA (US)

(73) Assignee: VISIONX, LLC, Cupertino, CA (US)

( * ) Notice: Subject to any disclaimer, the term of this patent is extended or adjusted under 35 U.S.C. 154(b) by 402 days.

(21) Appl. No.: 16/049,707

(22) Filed: Jul. 30, 2018

(65) Prior Publication Data

US 2020/0019938 A1 Jan. 16, 2020

Related U.S. Application Data

(60) Provisional application No. 62/697,295, filed on Jul. 12, 2018.

(51) Int. Cl.
*G06Q 20/06* (2012.01)
*G06N 99/00* (2019.01)
(Continued)

(52) U.S. Cl.
CPC .......... *G06Q 20/065* (2013.01); *G06F 21/55* (2013.01); *G06N 20/00* (2019.01); *G06F 16/35* (2019.01); *G06F 2221/034* (2013.01)

(58) Field of Classification Search
None
See application file for complete search history.

(56) References Cited

U.S. PATENT DOCUMENTS 7,899,173 B2 * 3/2011 Ahn ...................... G06Q 50/32
379/218.01
8,762,932 B2 * 6/2014 Narayana ............... G06Q 10/06
717/101
(Continued)

OTHER PUBLICATIONS

Zhe Su et al., "Force Estimation and Slip Detection/Classification for Grip Control using a Biomimetic Tactile Sensor", 2015 IEEE-RAS 15th International Conference on Humanoid Robots (Humanoids), Nov. 3-5, 2015, Seoul, Korea.
(Continued)

*Primary Examiner* — Firmin Backer
(74) *Attorney, Agent, or Firm* — Adler Pollock & Sheehan P.C

(57) ABSTRACT

The disclosed computer-implemented method for artificial-intelligence-based automated surface inspection can include receiving customer data, a request for a targeted model, and compensation for the requested targeted model. The compensation can include an agreement to contribute the customer data and/or targeted model to be available for other third-party entities. The method can also include retrieving the pre-trained model from a pre-trained model pool. The pre-trained model can be related to objects in a second industry. The method can include generating the targeted model from the pre-trained model and the customer data. The targeted model can be related to mapping sensor data to surface anomalies. The method can also include providing the targeted model to the third-party entity. The method can further include updating a distributed blockchain structure to include the at least one of the customer data and the targeted model.

20 Claims, 10 Drawing Sheets

(51) Int. Cl.
  G06N 20/00 (2019.01)
  G06F 21/55 (2013.01)
  G06F 16/35 (2019.01)

(56) References Cited

U.S. PATENT DOCUMENTS

| | | | |
|---|---|---|---|
| 9,704,143 | B2 | 7/2017 | Walker et al. |
| 9,760,910 | B1* | 9/2017 | Tuchman ............ G06Q 30/0269 |
| 9,849,364 | B2 | 12/2017 | Tran |
| 2007/0100864 | A1* | 5/2007 | Buchmiller ............ G06Q 10/06 |
| 2014/0095933 | A1* | 4/2014 | Griesinger .......... G06F 11/3688 |
| | | | 714/32 |
| 2017/0177898 | A1 | 6/2017 | Dillenberger |
| 2018/0047063 | A1* | 2/2018 | Tuchman ................ G06Q 50/01 |
| 2018/0096360 | A1 | 4/2018 | Christidis et al. |
| 2018/0130130 | A1 | 5/2018 | Dechu et al. |
| 2020/0019938 | A1* | 1/2020 | Wang ................... G06N 3/0454 |
| 2020/0167466 | A1* | 5/2020 | Cheng ................... G06F 21/552 |

OTHER PUBLICATIONS

Kuan Fang et al., "Learning Task-Oriented Grasping for Tool Manipulation from Simulated Self-Supervision", Jun. 25, 2018.
Mahler et al., "Dex-Net 2.0: Deep Learning to Plan Robust Grasps with Synthetic Point Clouds and Analytic Grasp Metrics", Mar. 27, 2017.
An Intuitive Guide to Deep Network Architectures (https://www.kdnuggets.com/2017/08/intuitive-guide-deep-network-architectures.html).
10 Advanced Deep Learning Architectures Data Scientists Should Know (https://www.analyticsvidhya.com/blog/2017/08/10-advanced-deep-learning-architectures-data-scientists/).
Fundamentals of Deep Learning—Starting with Artificial Neural Network (https://www.analyticsvidhya.com/blog/2016/03/introduction-deep-learning-fundamentals-neural-networks/).

* cited by examiner

SYSTEMS AND METHODS FOR ARTIFICIAL-INTELLIGENCE-BASED AUTOMATED SURFACE INSPECTION

CROSS-REFERENCE TO RELATED APPLICATION

This application claims priority to U.S. patent application Ser. No. 62/697,295, filed Jul. 12, 2018 which is incorporated herein by reference in its entirety.

FIELD OF THE INVENTION

The present disclosure relates to systems and methods for artificial-intelligence-based automated surface inspection.

BACKGROUND

Monitoring anomalies, such as pattern defects and particulate contamination, during the manufacturing processes is an important factor in increasing production yields. Numerous types of defects and contamination can occur on an object's surface. Determining the presence, location and type of an anomaly on the surface of an object can aid in both locating process steps at which the anomaly occurred and determining whether an object should be discarded.

Originally, anomalies were monitored manually by visual inspection of surfaces for the presence of defects. However, manual inspection proved time-consuming and unreliable due to operator errors or an operator's inability to observe certain defects. To decrease the time required to inspect object surfaces, many automatic inspection systems have been introduced. A substantial majority of these automatic inspection systems detect anomalies based on the scattering of light. These systems include two major components: illumination optics and collection-detection optics. Anomalies present on the surface scatter incident light. The collection optics detect the scattered light with reference to the known beam positions. The scattered light is then converted to electrical signals which can be measured, counted and displayed as bright spots on an oscilloscope or other monitor.

In such systems, a processor constructs templates from the detected light which corresponds to individual objects and then compares the templates to identify anomalies on the objects. However, mapping the detected light to anomalies, especially for many different objects, involves vary time consuming and expensive research to achieve usable mapping tables, which still often suffer from reliability shortcomings.

The instant disclosure, therefore, identifies and addresses a need for systems and methods for artificial-intelligence-based automated surface inspection.

SUMMARY

As will be described in greater detail below, the instant disclosure describes various systems and methods for artificial-intelligence-based automated surface inspection.

In some embodiments, for example, a method for artificial-intelligence-based automated surface inspection can include receiving, from a third-party entity: customer data related to surface anomalies of objects in a first industry, a request for a targeted model built from a pre-trained model and the customer data, and compensation for the requested targeted model. The compensation can include an agreement to contribute at least one of the customer data and the targeted model to be available for other third-party entities. The method can include retrieving the pre-trained model from a pre-trained model pool. The pre-trained model can be a model that was built from training data related to objects in a second industry. The method can include generating the targeted model from the pre-trained model and the customer data. The targeted model can be related to mapping sensor data to surface anomalies. The method can also include providing the targeted model to the third-party entity. The method can further include updating a distributed blockchain structure to include the at least one of the customer data and the targeted model.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

This disclosure relates to artificial-intelligence (AI), computer-based automated surface inspection. Such systems include trained models, i.e., algorithms having tunable parameters that have been fine-tuned or "trained." Training such models can be a highly burdensome endeavor involving considerable, or possibly prohibitive, amounts of time, expense, and computer-processing power. Advantageously, systems and methods disclosed herein can reduce these burdens. For example, embodiments disclosed herein can provide for the use of a pre-trained model and the computational resources of a decentralized network of nodes, e.g., computing devices, that can collectively train a model. The availability of such a node network for model training can relieve the model-seeking entity of the time and expense of obtaining such computer processing power on its own. The pre-trained model is a model that has already undergone some amount of training, thereby reducing the time for completing the remainder of its training. Also, embodiments disclosed herein can provide for storing data and models in a decentralized blockchain 414 that can be encrypted and can get replicated across a peer-to-peer network to maintain data privacy and integrity.

Figure 1:
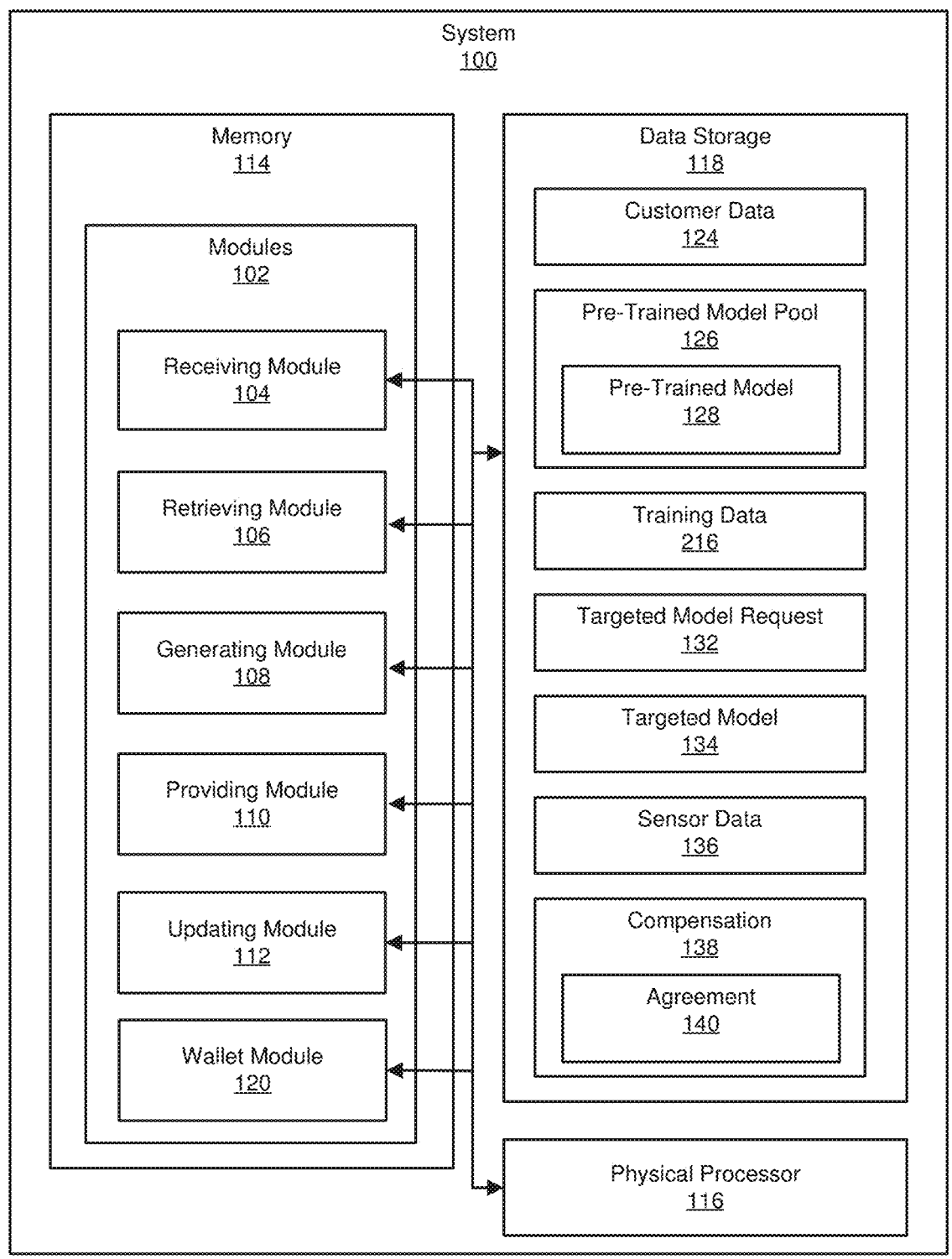
FIG. 1 is a block diagram of an example system for artificial-intelligence-based automated surface inspection.
Figure 2:
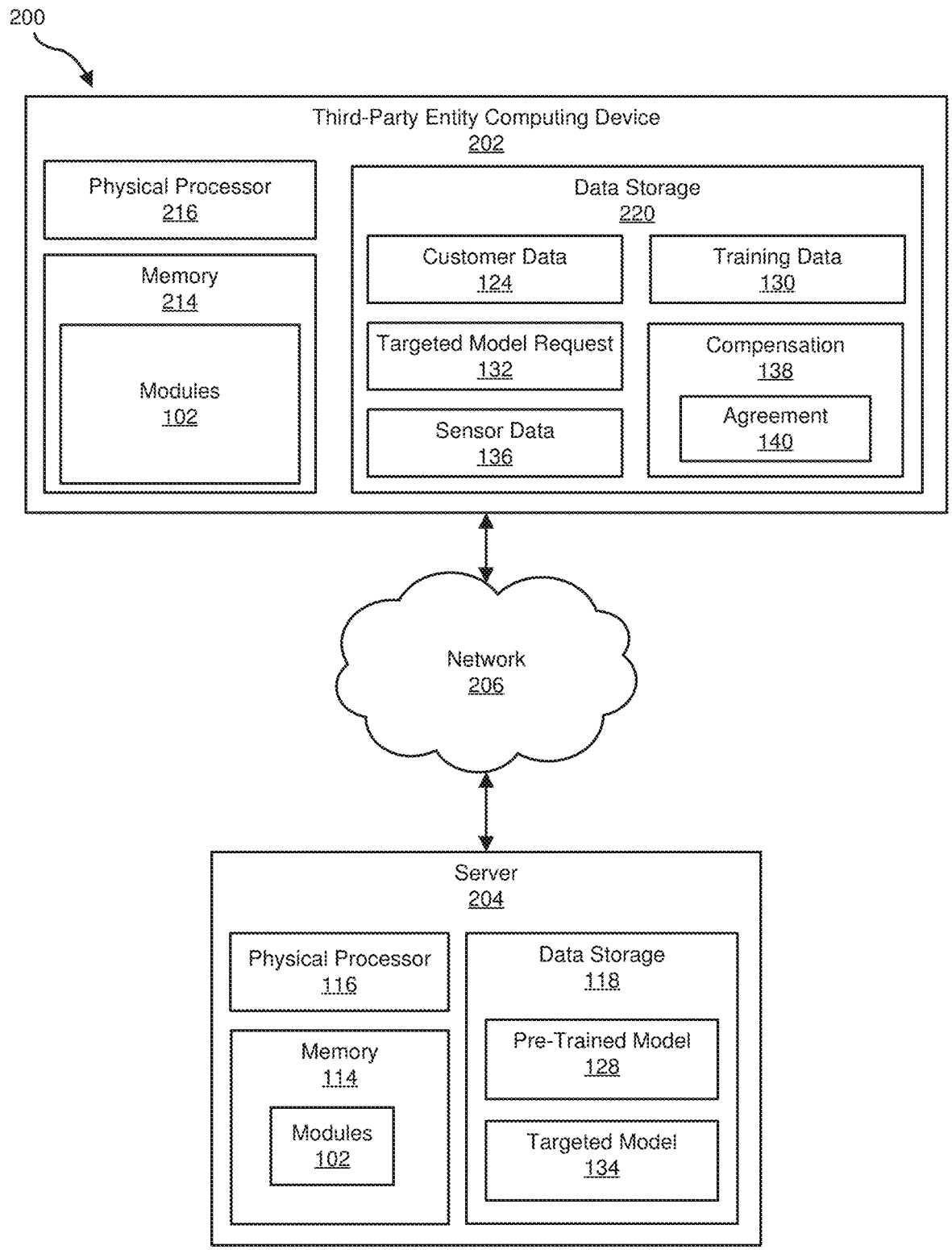
FIG. 2 is a block diagram of an example system including a computing device in communication with a server.

The following will provide, with reference to FIGS. 1-2, detailed descriptions of example systems for artificial-intelligence-based automated surface inspection. Detailed descriptions of corresponding computer-implemented methods will also be provided in connection with FIG. 3. Detailed descriptions of exemplary systems will be provided in connection with FIGS. 4-10.

FIG. 1 is a block diagram of an example system 100 for artificial-intelligence-based automated surface inspection. As illustrated in FIG. 1, example system 100 may include one or more modules 102 for performing one or more tasks. As will be explained in greater detail below, modules 102 may include a receiving module 104, a retrieving module 106, a generating module 108, a providing module 110, an updating module 112, and a wallet module 120. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 204). One or more of modules 102 in FIG. 1 may also represent all or portions of one or more special-purpose computers configured to perform one or more tasks.

As illustrated in FIG. 1, example system 100 may also include one or more memory devices, such as memory 114. Memory 114 generally represents any type or form of volatile or non-volatile storage device or medium capable of storing data and/or computer-readable instructions. In one example, memory 114 may store, load, and/or maintain one or more of modules 102. Examples of memory 114 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 116. Physical processor 116 generally represents any type or form of hardware-implemented processing unit capable of interpreting and/or executing computer-readable instructions. In one example, physical processor 116 may access and/or modify one or more of modules 102 stored in memory 114. Additionally, or alternatively, physical processor 116 may execute one or more of modules 102 to facilitate artificial-intelligence-based automated surface inspection. Examples of physical processor 116 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more data storage devices, such as data storage device 118. Data storage device 118 generally represents any type or form of storage device or medium capable of storing data and/or other computer-readable instructions. For example, data storage device 118 may be a magnetic disk drive (e.g., a so-called hard drive), a solid-state drive, a floppy disk drive, a magnetic tape drive, an optical disk drive, a flash drive, or the like.

In certain embodiments, data storage device 118 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Data storage device 118 may also include other similar structures or devices for allowing computer software, data, or other computer-readable instructions to be loaded into system 100. For example, data storage device 118 may be configured to read and write software, data, or other computer-readable information. Data storage device 118 may also be a part of system 100 or may be a separate device accessed through other interface systems.

In certain embodiments, such as the illustrated example in FIG. 1, data storage device 118 can store data representative of a customer data 124, a pre-trained model pool 126 including a pre-trained model 128, training data 130, a targeted model request 132, a targeted model 134, sensor data 136, compensation 138, and agreements 140 as described below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 204 via a network 206. Network 206 is represented as a network cloud, which could be an enterprise network, the Internet, a private network, etc. In one example, all or a portion of the functionality of modules 102 may be performed by computing device 202, server 204, and/or any other suitable computing system. As will be described in greater detail below, one or more of modules 102 from FIG. 1 may, when executed by at least one processor of computing device 202 and/or server 204, enable computing device 202 and/or server 204 to perform artificial-intelligence-based automated surface inspection. For example, and as will be described in greater detail below, one or more of modules 102 may cause server 204 to receive customer data related to surface anomalies of objects in a first industry from third-party entity computing device 202, to receive requests for a targeted model from third-party entity computing device 202, to retrieve pre-trained models from a pre-trained model pool, to generate targeted models from pre-trained models and customer data, and to provide the targeted model to the third-party entity computing device 202.

Third-party computing device 202 generally represents any type or form of computing device capable of reading computer-executable instructions. For example, computing device 202 may include an endpoint device (e.g., a mobile computing device) running client-side software capable of transferring data across a network such as network 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

As illustrated in FIG. 2, example computing device 202 may also include one or more memory devices, such as memory 214. Memory 214 generally represents any type or form of volatile or non-volatile storage device or medium capable of storing data and/or computer-readable instructions. In one example, memory 214 may store, load, and/or maintain one or more of modules 102. Examples of memory 214 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example computing device 202 may also include one or more physical processors, such as physical processor 216. Physical processor 216 generally represents any type or form of hardware-implemented processing unit capable of interpreting and/or executing computer-readable instructions. In one example, physical processor 216 may access and/or modify one or more of modules 102 stored in memory 214. Additionally, or alternatively, physical processor 216 may execute one or more of modules 102 to facilitate artificial-intelligence-based automated surface inspection. Examples of physical processor 216 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example computing device 202 may also include one or more data storage devices, such as data storage device 220. Data storage device 220 generally represents any type or form of storage device or medium capable of storing data and/or other computer-readable instructions. For example, data storage device 220 may be a magnetic disk drive (e.g., a so-called hard drive), a solid-state drive, a floppy disk drive, a magnetic tape drive, an optical disk drive, a flash drive, or the like.

In certain embodiments, data storage device 220 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Data storage device 220 may also include other similar structures or devices for allowing computer software, data, or other computer-readable instructions to be loaded into computing device 202. For example, data storage device 220 may be configured to read and write software, data, or other computer-readable information. Data storage device 220 may also be a part of computing device 202 or may be a separate device accessed through other interface systems.

In certain embodiments, such as the illustrated example in FIG. 2, data storage device 220 can store data representative of customer data 124, a targeted model request 132, sensor data 136, compensation 138, and agreements 140 as described below.

Server 204 generally represents any type or form of computing device that can facilitate access to remote computing devices, including third-party computing device 202. Additional examples of server 204 include, without limitation, security servers, application servers, web servers, storage servers, and/or database servers configured to run certain software applications and/or provide various security, web, storage, and/or database services. Although illustrated as a single entity in FIG. 2, server 204 may include and/or represent a plurality of servers that work and/or operate in conjunction with one another.

Network 206 generally represents any medium or architecture capable of facilitating communication or data transfer. In one example, network 206 may facilitate communication between third-party computing device 202 and server 204. In this example, network 206 may facilitate communication or data transfer using wireless and/or wired connections. Examples of network 206 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
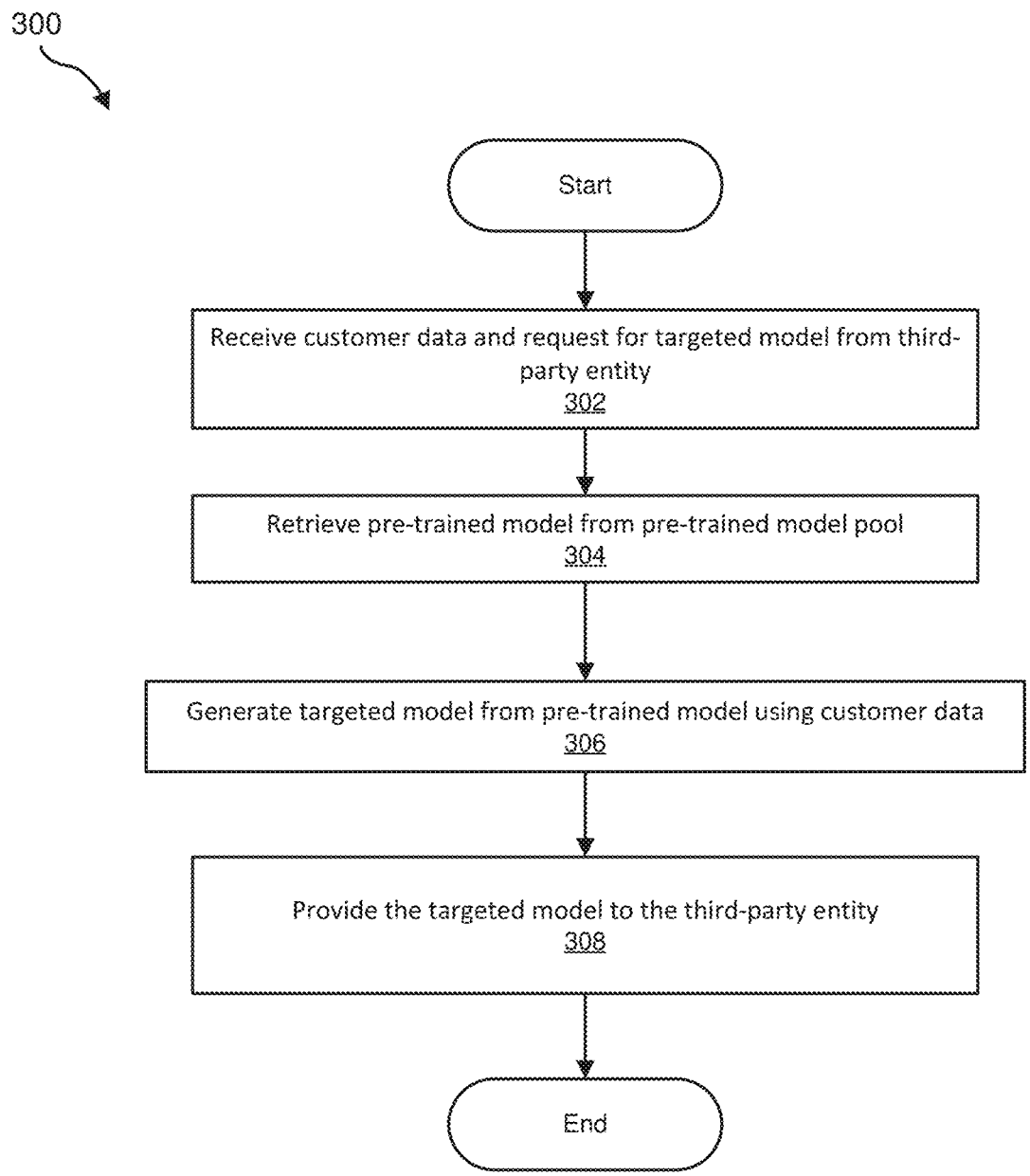
FIG. 3 is a flow diagram of an example computer-implemented method for artificial intelligence based automated surface inspection.

FIG. 3 is a flow diagram of an example computer-implemented method 300 for artificial intelligence based automated surface inspection. The steps shown in FIG. 3 may be performed by any suitable computer-executable code and/or computing system. In one example, each of the steps shown in FIG. 3 may represent an algorithm whose structure includes and/or is represented by multiple sub-steps.

In some embodiments, automated surface inspection can include using automated AI technology to analyze images of items being examined for various types of irregularities, such as damage or flaws. Such items can include, without limitation, various types of products, merchandise, raw materials, and articles of manufacturing. The image analysis can include classifying each image according to a detected type of anomaly or as being free from defects or damage. Thus, the automated surface inspection becomes an image classification problem, which involves the task of using a classification model to assign a classification label to an input image, where the assigned classification label is for one image classification of two or more possible image classifications. There are several challenges involved in this task from the perspective of a Computer Vision algorithm, such as variations in object orientation, scale, and illumination, as well as object deformation and background clutter. To account for these challenges, it is preferable to use large datasets to train the classification model because a model becomes increasingly optimal as the amount of training data is increased.

Training classification models is also a demanding undertaking when considered from the perspective of processing power. For example, a classification model can include a Convolutional Neural Network (CNN) having a suitable network architecture, such as LeNet-5, AlexNet, VGG 16, Inception, ResNet, ResNeXt, or DenseNet, among others. The use of such models can involve the execution of hundreds of computer-intensive functions for each of hundreds of thousands of iterations.

Acquiring such large datasets along with the enormous processing power, time, and expense involved with training an image classification model can present a considerable burden for entities seeking to implement an AI-based system or process.

Advantageously, however, embodiments disclosed herein address this burden by providing solutions that reduce the expense and effort involved in acquiring large datasets and processing power for model training, while still allowing for privacy and data integrity. For example, embodiments disclosed herein can include systems and methods that can provide customers with a pre-trained model and the computational resources of a decentralized network 402 of nodes 408 (shown in FIG. 4), e.g., computing devices, that can collectively train a model. In some embodiments, a customer can provide training data with a request for model training, and in response, the pre-trained model and customer-provided training data can be distributed among a plurality of the networked nodes 402. The data and model can be stored in a decentralized blockchain 414 that gets replicated across a peer-to-peer network to maintain data integrity. The data can also be encrypted to keep the data private.

In some embodiments, the customer may provide their own model in addition to the customer data. In other words, the customer may be a new customer and has a raw model that is not pre-trained or acquired from the system. If the customer wants, it may provide this raw model and the corresponding data to the system for further improvement or enhancement. In the alternative, the customer may be a repeat customer and may already have acquired a pre-trained model, and may submit its prior pre-trained model to the system for further refinement.

As illustrated in FIG. 3, at step 302, one or more of the systems described herein can receive customer data related to surface anomalies of objects in a first industry from a third-party entity and can receive a request for a targeted model built from a pre-trained model and the data. For example, receiving module 104 may, as part of server 204 in FIG. 2, receive customer data 124 and a targeted model request 132 from the third-party entity computing device 202. In some embodiments, the server 204 can store the received customer data 124 in local data storage 118. In some embodiments, the server 204 can store the received targeted model request 132 in local data storage 118. Additionally, or alternatively, the customer data 124 and the targeted model 134 can be stored in a distributed blockchain 414 structure.

The term "industry," as used herein, generally refers to companies, people, and activities involved in a type of a group of establishments, companies, people, or other types of entities engaged in producing or handling the same product or group of products or in rendering the same services. Examples of industries include, without limitation, industrial machinery manufacturing, household appliance stores, automobile manufacturing, and security guards and patrol services. More examples include, without limitation, industries listed in North American Industry Classification System, 2017, Executive Office of the President, Office of Management and Budget, United States.

In some embodiments, step 302 can include receiving compensation for the requested targeted model from the third-party entity. For example, the receiving module 104 may, as part of server 204 in FIG. 2, receive compensation 138 from the third-party entity computing device 202. In some embodiments, the server 204 can store the received compensation 138 in local data storage 118. In some embodiments, the compensation 138 can include an agreement 140 to contribute at least one of the customer data 124 and the targeted model 134 to be available for other third-party entities. In some embodiments, the compensation 138 can include fiat currency, virtual currency, or a combination of currencies.

In some embodiments, as discussed in greater detail below, the systems and methods described herein can include peer-to-peer cryptographic blockchain 414, virtual currency, and smart contract management. In some such embodiments, the systems and methods described herein can include peer-to-peer cryptographic virtual currency trading for an exchange of one or more virtual tokens for goods or services. In some such embodiments, the compensation 138 can include currency, which can include fiat currency, virtual currency, or a combination thereof. Also, in some such embodiments, systems and methods provide smart contract management such that the agreement 140 can be created in the form of a smart contract.

Embodiments disclosed herein can include systems and methods that include peer-to-peer cryptographic virtual currency trading for an exchange of one or more tokens in a wallet module 120, also referred to as a virtual wallet 120, for purchasing goods (e.g., a trained model or customer training data) or services (e.g., processing power or mining provided by a mining mode). The system can determine whether the virtual wallet 120 has a sufficient quantity of Blockchain tokens to purchase the goods or services at the purchase price. In various embodiments, in response to verifying that the virtual wallet 120 has a sufficient quantity of Blockchain tokens, the purchase is completed. In one or more embodiments, if the virtual wallet 120 has insufficient Blockchain tokens for purchasing goods or services, the purchase is terminated without exchanging Blockchain tokens.

A cryptographic virtual currency is a digital medium of exchange that enables distributed, rapid, cryptographically secure, confirmed transactions for goods and/or services. Cryptographic virtual currencies can include specifications regarding the use of virtual currency that seeks to incorporate principles of cryptography (e.g., public-key cryptography) to implement a distributed and decentralized economy. A virtual currency can be computationally brought into existence by an issuer (e.g., "mined"). Virtual currency can be stored in a virtual cryptographic wallet module 120, which can include software and/or hardware technology to store cryptographic keys and cryptographic virtual currency. Virtual currency can be purchased, sold (e.g., for goods and/or services), traded, or exchanged for a different virtual currency or cryptographic virtual currency, for example. A sender makes a payment (or otherwise transfers ownership) of virtual currency by broadcasting (e.g., in packets or other data structures) a transaction message to nodes 408 on a peer-to-peer network 402. The transaction message can include the quantity of virtual currency changing ownership (e.g., four tokens) and the receiver's (i.e., the new token owner's) public key-based address. Transaction messages can be sent through the Internet, without the need to trust a third party, so settlements can be extremely timely and efficient.

In one or more embodiments, the systems and methods described herein can include a cryptographic protocol for exchanging virtual currency between nodes 408 on a peer-to-peer network 402. A wallet module 120 or transaction can house one or more virtual tokens.

Systems and methods described herein in various embodiments can generate and/or modify a cryptographic virtual currency wallet 120 for facilitating transactions, securely storing virtual tokens, and providing other technology such as generating and maintaining cryptographic keys, generating local and network messages, generating market orders, updating ledgers, performing currency conversion, and providing market data, for example.

The described technology, in various embodiments, can verify virtual currency ownership to prevent fraud. Ownership can be based on ownership entries in ledgers 412 that are maintained by devices connected in a decentralized network, including the network 402 of nodes 408 and the server 406. The ledgers 412 can be mathematically linked to the owners' public-private key pairs generated by the owners' respective wallets, for example. Ledgers 412 record entries for each change of ownership of each virtual token exchanged in the network 402. A ledger 412 is a data structure (e.g., text, structured text, a database record, etc.) that resides on all or a portion of the network 402 of nodes 408. After a transaction (i.e., a message indicating a change of ownership) is broadcast to the network 402, the nodes 408 verify in their respective ledgers 412 that the sender has proper chain of title, based on previously recorded ownership entries for that virtual token. Verification of a transaction is based on mutual consensus among the nodes 408. For example, to verify that the sender has the right to pass ownership to a receiver, the nodes 408 compare their respective ledgers 412 to see if there is a break in the chain of title. A break in the chain of title is detected when there is a discrepancy in one or more of the ledgers 412, signifying a potentially fraudulent transaction. A fraudulent transaction, in various embodiments, is recorded (e.g., in the same ledger 412 or a different ledger 412 and/or database) for use by the authorities, for example (e.g., the Securities and Exchange Commission). If the nodes 408 agree that the sender is the owner of the virtual token, the ledgers 412 are updated to indicate a new ownership transaction, and the receiver becomes the virtual token's owner.

Systems and methods described herein also provide smart contract management. A smart contract is a computerized transaction protocol that executes the terms of an agreement 140. A smart contract can have one or more of the following fields: object of agreement, first party blockchain address, second party blockchain address, essential content of contract, signature slots and blockchain ID associated with the contract. The contract can be generated based on the user input or automatically in response to predetermined conditions being satisfied. The smart contract can be in the form of bytecodes for machine interpretation or can be the markup language for human consumption. If there are other contracts that are incorporated by reference, the other contracts are formed in a nested hierarchy similar to program language procedures/subroutines and then embedded inside the contract. A smart contract can be assigned a unique blockchain number and inserted into a blockchain. The smart contract can be sent to one or more recipients for executing the terms of the contract and, if specified contractual conditions are met, the smart contract can authorize payment. If a dispute arises, the terms in the smart contract can be presented for a judge, jury, or lawyer to apply legal analysis and determine the parties' obligations.

Advantages of a blockchain smart contract can include one or more of the following:
  Speed and real-time updates. Because smart contracts use software code to automate tasks that are typically accomplished through manual means, they can increase the speed of a wide variety of business processes.
  Accuracy. Automated transactions are not only faster but less prone to manual error.
  Lower execution risk. The decentralized process of execution virtually eliminates the risk of manipulation, nonperformance, or errors, since execution is managed automatically by the network rather than an individual party.
  Fewer intermediaries. Smart contracts can reduce or eliminate reliance on third-party intermediaries that provide "trust" services such as escrow between counterparties.
  Lower cost. New processes enabled by smart contracts require less human intervention and fewer intermediaries and will therefore reduce costs.

At step 304, one or more of the systems described herein may retrieve a pre-trained model 128 from a pre-trained model pool 126. A pre-trained model 128 is a model that has undergone some training, e.g., has been fed some training data or has undergone some other form of parameter adjustment to improve the accuracy of the model without yet achieving a level of accuracy desired. As a result, a pre-trained model 128 can be ready for deployment in less time, using less computing resources, and using less training data than a model being trained from scratch. Embodiments of the systems and methods disclosed herein can include pre-trained models 128 that can be applied to multiple different industries and research scenes, and the whole system can be updated to be more accurate with the data from different scenes.

In some embodiments, the levels of training data 130 and computing resources can automatically reach predetermined designated threshold levels that trigger construction of such pre-trained models 128. Upon reaching the threshold, a pre-trained model is constructed and then added to the pre-trained model pool 126. The pre-trained model pool 126 includes pre-trained models 128 that can be further trained upon request for a trained or targeted model 134 with the help of transfer learning technology. The pre-trained models 128 can be built as described in connection with FIG. 6.

At step 306, one or more of the systems described herein may generate the targeted model 134 from the pre-trained model 128 and the customer data 124. In some embodiments, the targeted model 134 can be related to mapping sensor data 136 to surface anomalies. In some embodiments, the received customer data 124 and the pre-trained model 128 are transmitted to one or more of a plurality of network 402 of nodes 408, where the training of the pre-trained model 128 is completed by one or more of the nodes 408. Once the training is complete, the targeted model 134 is received from the one or more of the plurality of network 402 of nodes 408. In some embodiments, nodes 408 can provide processing power in exchange for compensation 138. In such embodiments, the compensation 138 is transmitted to the one or more nodes 408 that provided the processing power to train the model 134.

At step 308, one or more of the systems described herein may provide the targeted model 134 upon completion to the third-party entity computing device 202. In some embodiments, the transmitting of the model 134 may be contingent upon first receiving compensation 138 from the third-party computing device 202 for the preparation of the targeted model.

Systems and methods disclosed herein are applicable to many industries, including those where it is desirable to seek out and implement opportunities for increasing production-line automation. Many deep-learning based industrial-level projects confront big challenges that are not flexible enough to be published and shared. Moreover, a centralized deep-learning model is unable to collect idle resources to implement larger-scale computing and time-saving tasks. To address these problems, embodiments of the present disclosure include Blockchain-Based Defect Inspection using AI. Systems and methods herein involve improvements to the performance of AI technologies, allowing for an increased number of industrial issues to be handled by AI technology. Embodiments of the systems and methods disclosed herein can provide improved training accuracy by incorporating the ability to update models in real time as data is received from a multitude of users on an ongoing basis.

FIGS. 4-10 show schematic diagrams of embodiments that serve as alternative embodiments to those shown in FIGS. 1 and 2. Even further embodiments include combinations of all or portions of the embodiments shown in FIGS. 1-10. For example, the networked nodes 402, including nodes 408, can be implemented with any of the embodiments disclosed herein to allow for implementation of distributed model training, blockchains, virtual currency, and/or smart contracts.

Figure 4:
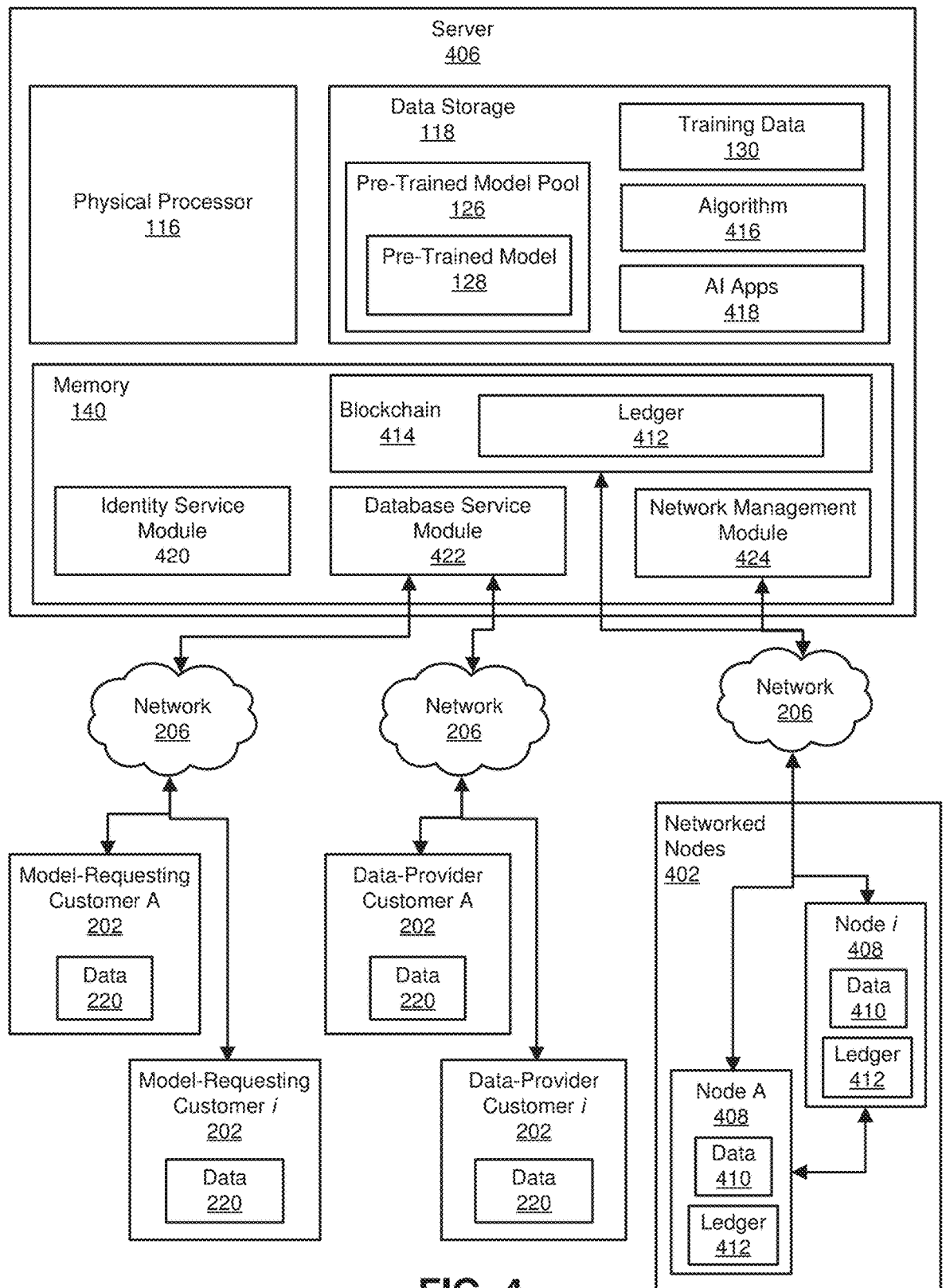
FIGS. 4 and 5 are block diagrams of embodiments disclosed herein having exemplary customer systems in communication with a server.
Figure 5:
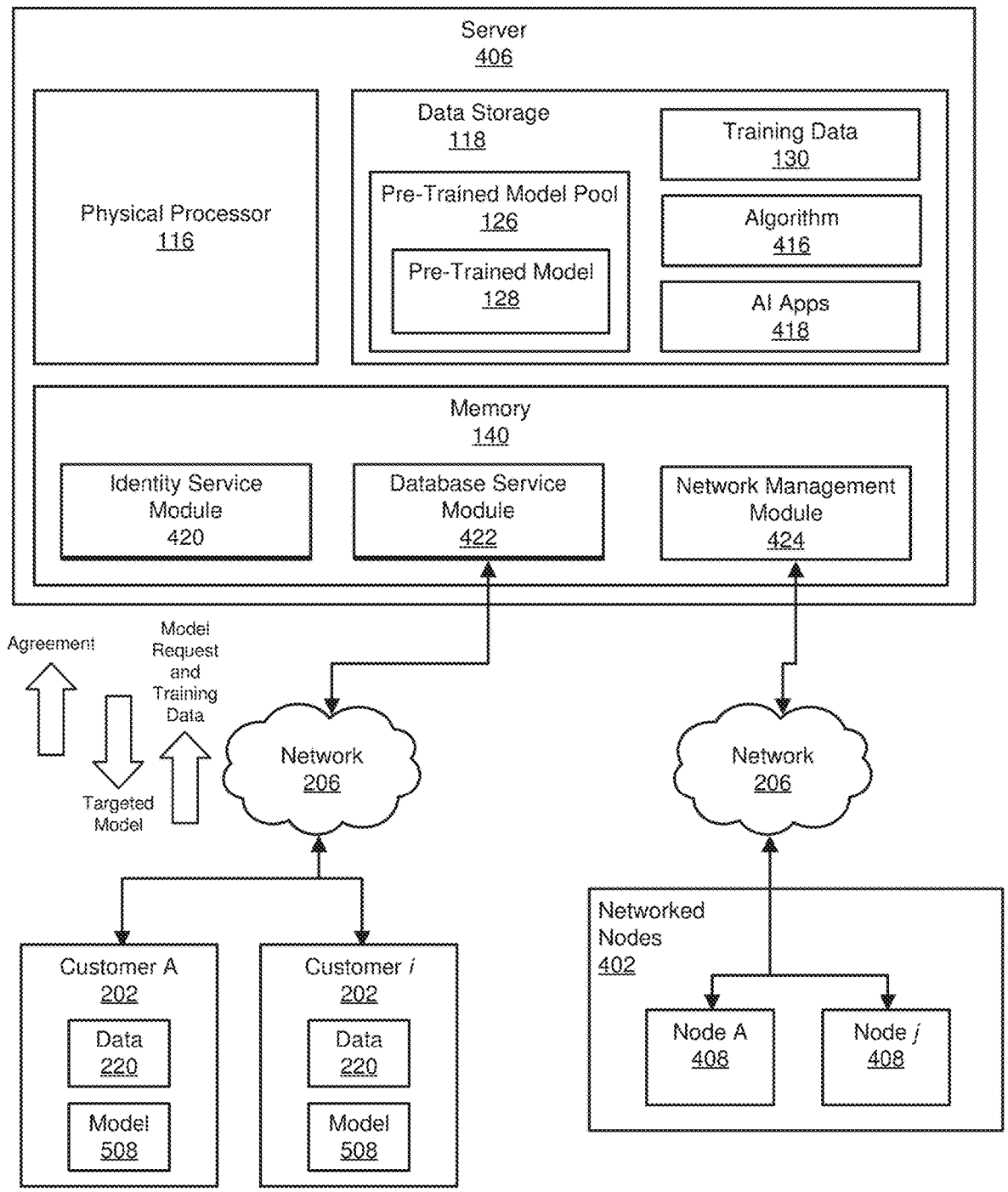

FIGS. 4 and 5 show schematic diagrams of a system for generating and storing AI-related models and data using blockchain technology. FIG. 4 illustrates a scenario where virtual currency is exchanged for model training, training data, trained models, and other goods and services. FIG. 5 illustrates an optional bartering scenario, for example where a customer issues request for a trained, targeted model from the server 406, along with training data. In response, the customer receives the trained model. However, instead of making a payment with currency, the customer signs an agreement to allow the server 406 to keep the training data and its own copy of the trained model.

As shown, the system generally includes a server 406, customers 202, and a network 402 of nodes 408, where the server 406, customers 202, and nodes 408 are representative of processor-based computers or other such electronic devices. Although only a single server 406 is shown, it should be appreciated that the system can include a plurality of such servers 406 that form a network. The server 406 includes a physical processor 116, a data storage device 118, and memory 140 as described above. The data storage device 118 can include digital information described herein, including a pre-trained model pool 126 including a pre-trained model 128 and training data 130. In addition, the data storage device 118 can store algorithms 416 used for building pre-trained models 128 and AI applications 418 that includes AI applications, and optionally an AI application marketplace, which can include a wide variety of AI applications that can be used locally on the server 406 or distributed to customers.

The memory 140 can include modules described herein. In addition, the memory 140 can include a blockchain 414 including a blockchain ledger 412, an identity service module 420, a database service module 422, and a network management module 426. Identity service module 420 can provide authentication, service rules, and service tokens to other server modules and manage commands, projects, customers/users, groups, and roles. Network management module 426 can provide network virtualization technology and network connectivity services to other server services, providing interfaces to service users that can define networks, subnets, virtual IP addresses, and load-balancing. Database service module 422 can provide extensible and reliable relational and non-relational database service engines to users.

As further shown, a plurality of customers 202 are configured to conduct transactions with the server 406 as described in detail below. Also, a plurality of nodes 408 are configured and arranged in a peer-to-peer network 402. Although only two nodes 408 are shown, it should be appreciated that the system can include a plurality of nodes 408, and although only one node network 402 is shown, it should be appreciated that the system can include a plurality of node networks 402. The server 406 can be considered to form part of a distributed storage system with the network 402 of nodes 408.

Thus, according to one exemplary aspect, a plurality of customers 202 can be communicatively coupled to the server 406 through one or more computer networks 206. In some embodiments, the network 106 shown comprises the Internet. In other embodiments, other networks, such as an intranet, WAN, or LAN may be used. Moreover, some aspects of the present disclosure may operate within a single computer, server, or other processor-based electronic device. The server 406 can be connected to some customers 202 that constitute model-requesting customers 202 that are transmitting requests to the server 406, for example for data, models, or model-training service. The server 406 can also be connected to some customers 202 that constitute data-provider customers 202 that are transmitting offers to the server 406 offering training data or trained models. It should be appreciated that a single customer 202 can act as a requesting customer at times and as an offering customer at times, and both an offering and a requesting customer at the same time, for example offering training data in exchange for getting a model trained by the server 406.

The network 402 includes a series of network nodes 408, which may be many different types of computing devices operating on the network 402 and communicating over the network 402. The network 402 may be an autonomous peer-to-peer network, which allows communication between nodes 408 on the network 402, an amount of data access to servers, etc. The number of network nodes 408 can vary depending on the size of the network 402.

A blockchain 414 having a ledger 412 can be used to store the transactions being conducted and processed by the network 402. In some embodiments, blockchain 414 is stored in a decentralized manner on a plurality of nodes 408, e.g., computing devices located in one or more networks 402, and on server 406. Server 406 and Nodes 408 may each electronically store at least a portion of a ledger 412 of blockchain 414. Ledger 412 includes any data blocks 102 that have been validated and added to the blockchain 414. In some embodiments, the server 406 and every node 408 can store the entire ledger 412. In some embodiments, the server 406 and each node 408 can store at least a portion of ledger 412. In some embodiments, some or all of blockchain 414 can be stored in a centralized manner. The server 406 and nodes 408 can communicate with one another via communication pathways that can include wired and wireless connections, over the internet, etc. to transmit and receive data related to ledger 412. For example, as new data blocks are added to ledger 412, the server 406 and nodes 408 can communicate or share the new data blocks with other nodes 408. In some embodiments, the server 406 may not have a ledger 412 of the blockchain 414 stored locally and instead can be configured to communicate blockchain interaction requests to one or more nodes 408 to perform operations on the blockchain 414 and report back to the server as appropriate.

The network 402 of nodes 408 can also serve as a computing-power resource pool for the server 406. In some embodiments, the network 402 can include several networks 402 spread over geographic regions as small as a single node or physical location, or as large as a global collection of networks 402 of nodes 408 dispersed worldwide. Very large global networks 402 of nodes also have the potential to collect and store large amounts of training data.

Figure 6:
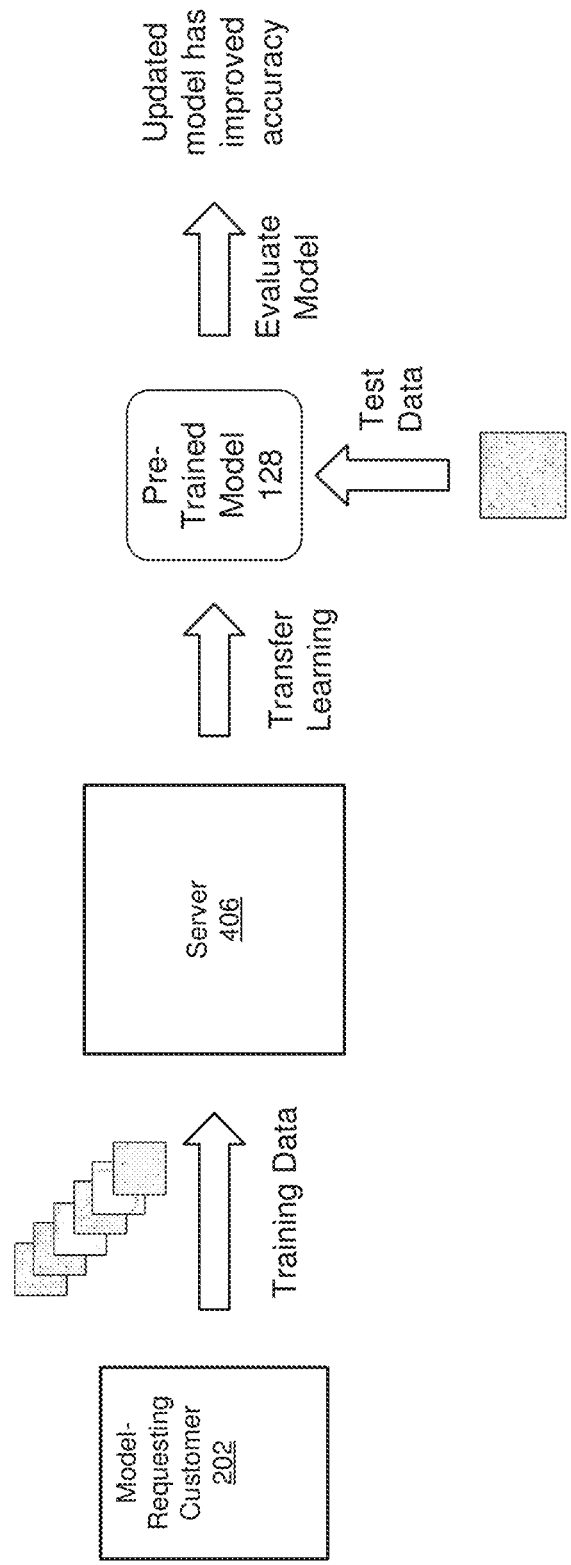
FIG. 6 a flow diagram of an example computer-implemented method for training a classification model.

Referring to FIG. 6, a schematic diagram illustrates preparation of a pre-trained model 128. Building a fully trained model generally involves at least four stages: model construction, model training, model testing, and model Evaluation. A pre-trained model 128 only involves the first two stages: construction and partial training. At the model construction stage, a model is selected and combined with a suitable architecture. The model selection is based on the problem being solved. For example, a classification model can include a Convolutional Neural Network (CNN) having a suitable network architecture, such as LeNet-5, AlexNet, VGG 16, Inception, ResNet, ResNeXt, or DenseNet, among others. The full training of such models can involve the execution of hundreds of computer-intensive functions for each of hundreds of thousands of iterations. For pre-trained model, that amount can be reduced.

Classification models are used to learn features and patterns that best represent the data. Classification models can be applied to image classification, text classification, speech recognition, and predicting time series statistics. The training phase is the phase in which network tries to learn from the training data. The CNN model is a multi-layer network, and each layer of data is assigned some random weights. A "classifier" runs a forward pass through the data, predicting the class labels and scores using those weights. Class scores are then compared to actual labels and an error is computed via a loss function. The error is then back propagated through the network and weights are updated accordingly.

For transfer learning, the training can be done where pre-trained models on other datasets. Also, instead of initializing layer weights randomly (as is often done before training a model from scratch), learned weights from the pre-trained model can be used for each layer, and then further train the model on the training data.

Two examples of forms of transfer learning include (1) fine tuning all or selected layers of a pre-trained network on a data set by continuing the back propagation, and (2) use pre-trained CNN as a fixed feature extractor for data and train a linear classifier like SVM using those features. The second approach is ideal if the data set is very small and fine-tuning your model may result in over-fitting.

Referring to FIG. 6, the model testing can be done at the server 406 or elsewhere using transfer learning. Training data is used that could have come from any available source. The server constructs the model, including desired layers, architecture, and loss function. The model training then begins with the training data. In general, the neural network receives the incoming training data, in this case image data, runs the image through the layers, and attempts to apply weightings for each layer along the way. The CNN then outputs a conclusion, which is evaluated by a training algorithm. If the output was incorrect, the error is propagated backward through the layers for new guesses. This continues up and down through the layers until as time and training data permits. At the server 406, the pre-trained model 128 can sometimes still work adequately for evaluation of unknown data. Testing of the model can provide an indication of how accurate the pre-trained model became with just the limited training.

When a customer 202 want to train a model, train their specific model, they have two options: a) locally train the model using their AI mining machine (AIM), orb) publish training tasks on the server 506. By utilizing transfer learning, customers can easily get their target model with small amount of data, which consumes much less time. In some embodiments, the pre-trained model 128 may have been built using training data related to objects in a second industry that is different from the first industry for which the third-party entity is requesting a targeted model. For example, as discussed in greater detail below, embodiments of the present disclosure can include pre-trained models made using deep learning and imaging systems that can be used to extend models across multiple industries. Such multi-industry pre-trained models help to address challenges related to the enormous amount of data. Multi-industry pre-trained models have the potential to serve a wider array of entities than more niche models, thereby increasing the availability of pre-trained models. Also, pre-trained models have a training head start over completely untrained models and can therefore complete training in less time and with less training data than a completely untrained model. In other embodiments, the pre-trained model 128 may have been built using training data related to objects in a second industry that is same or similar to the first industry for which the third-party entity is requesting a targeted model.

Figure 7:
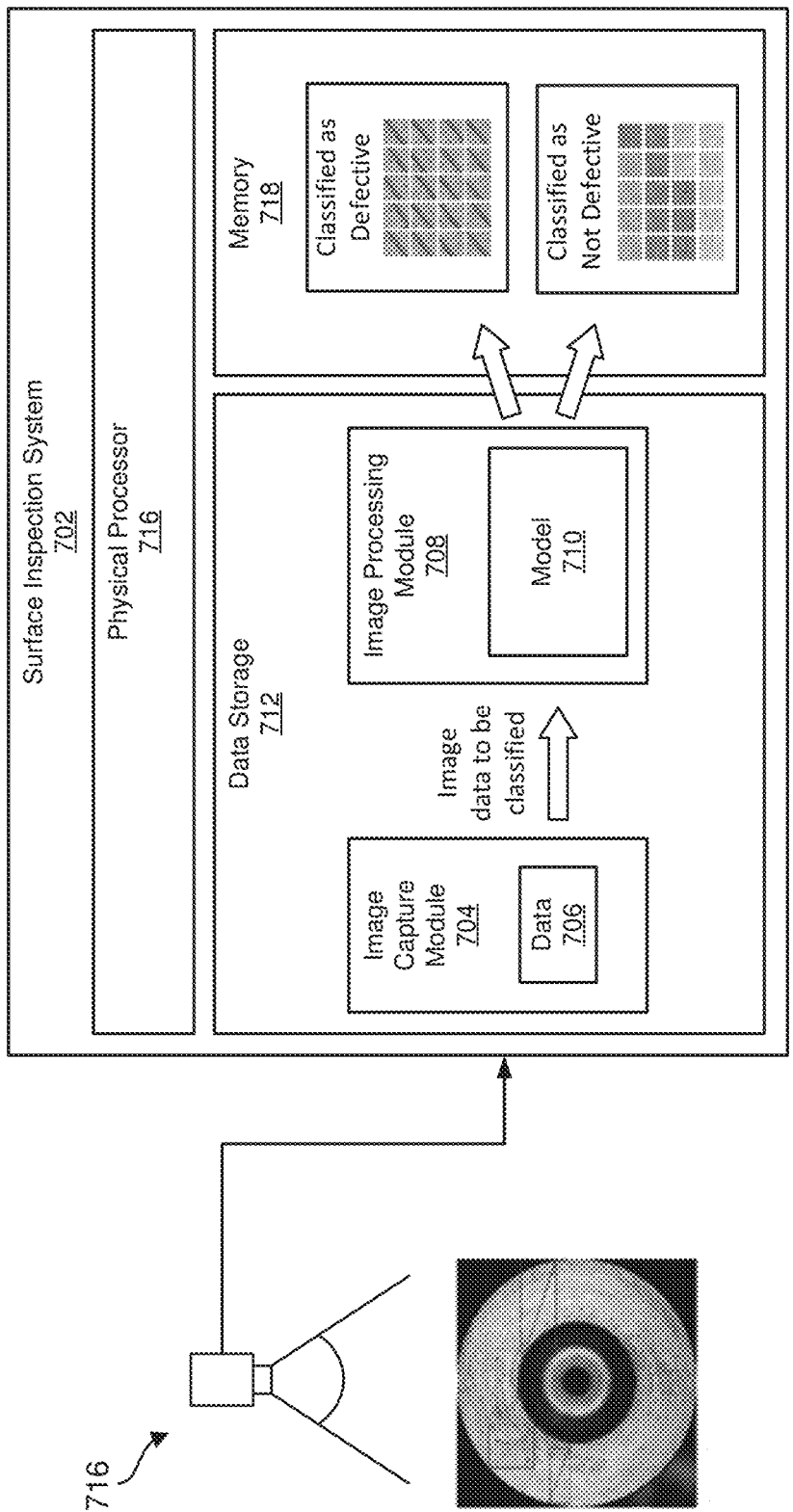
FIG. 7 is a schematic diagram of an embodiment of a surface inspection system.

Referring to FIG. 7, a schematic block diagram illustrating a system and method for an embodiment of an automatic surface inspection system 702. The illustrated embodiment of the surface inspection system 702 includes one or more physical processors 716, data storage 712, and computer memory 718. The data storage 712 includes an image capture module 704 and an image processing module 708. The image capture module 704 is configured for interacting with, and receiving image data 706 from, one or more cameras 716. The image processing module 708 is configured for interacting with, and receiving image data from, the image capture module 704. The image processing module 708 includes a classification model 710 that that has previously been trained to classify image data 706, thereby detecting surface anomalies in the images. The memory 718 is configured for interacting with—and receiving image data from—the image processing module 708 or data storage 712. The memory 718 can also store reports, raw data, and other information generated during the surface inspection process described above and performed by the system 702.

In certain embodiments, image capture module 704 and/or the image processing module 708 in FIG. 7 may represent one or more software applications or programs that, when executed by a computing device, may cause the computing device to perform one or more tasks. For example, one or both modules 704, 708 may represent modules stored and configured to run on one or more computing devices, such as the devices illustrated in FIG. 7. One or more of modules in FIG. 7 may also represent all or portions of one or more special-purpose computers configured to perform one or more tasks.

As illustrated in FIG. 7, example system 702 may also include one or more memory devices, such as memory 718. Memory 718 generally represents any type or form of volatile or non-volatile storage device or medium capable of storing data and/or computer-readable instructions. In one example, memory 718 may store, load, and/or maintain one or more of modules 704 and 708. Examples of memory 718 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 702 may also include one or more physical processors, such as physical processor 716. Physical processor 716 generally represents any type or form of hardware-implemented processing unit capable of interpreting and/or executing computer-readable instructions. In one example, physical processor 716 may access and/or modify one or more of modules 704, 708. Additionally, or alternatively, physical processor 716 may execute one or more of modules 704, 708 to facilitate artificial-intelligence-based automated surface inspection. Examples of physical processor 716 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 7, example system 702 may also include one or more data storage devices, such as data storage device 712. Data storage device 712 generally represents any type or form of storage device or medium capable of storing data and/or other computer-readable instructions. For example, data storage device 712 may be a magnetic disk drive (e.g., a so-called hard drive), a solid-state drive, a floppy disk drive, a magnetic tape drive, an optical disk drive, a flash drive, or the like.

In certain embodiments, data storage device 712 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Data storage device 712 may also include other similar structures or devices for allowing computer software, data, or other computer-readable instructions to be loaded into system 702. For example, data storage device 712 may be configured to read and write software, data, or other computer-readable information. Data storage device 712 may also be a part of system 702 or may be a separate device accessed through other interface systems.

Recognizing and identifying defect patterns can include writing information representative of defects for each synthetic disc are written to a file along with labels identifying the simulated defect patterns. These files are used in the training of classifier models having classifier algorithms. To verify the correct behavior of a classifier model trained with the synthetically generated discs having simulated defects, a smaller set of labeled real defect data is used to validate the classification performance. After validation, the trained classifier model is deployed for use in identifying defective data patterns on test specimens of magnetic media or discs.

In some embodiments, a traditional data science approach can be used for surface processing where a user manually engineers features (e.g., mathematical expressions) from the preprocessed and clustered defect data. These features can then be fed to a classifier algorithm that can either be constructed from expert experience or, in one embodiment, through automatic learning techniques, such as a CNN.

The image processing model and algorithm can vary. As an example, some embodiments can use a CNN model that includes multiple layers and steps of computations categorized as feature extraction computations and then classification computations. A convolutional computation applies filters to enhance and/or diminish pixel values. After convolution, a pooling operation downsamples the image or reduces the image resolution. The convolution and pooling are repeated for several iterations, revising the previous image and forming a new image. Sometimes the images get smaller in size or larger in size. Sometimes image pixels are enhanced, and sometimes image pixels are de-enhanced. Enhanced pixels show defects that fit a particular defect pattern, while de-enhanced pixels show image areas that do not fit a particular defect pattern. The number, amount, and combination of convolution and pooling layers or operations varies, for example depending on the image being analyzed. After the convolution and pooling operations, the method includes flattening and connecting densities. This can entail converting image outputs from layers to a one-dimensional vector of pixel values. The one-dimensional vector is then classified, and an output of the process includes identified or labeled indicators of defect pattern types.

Figure 8:
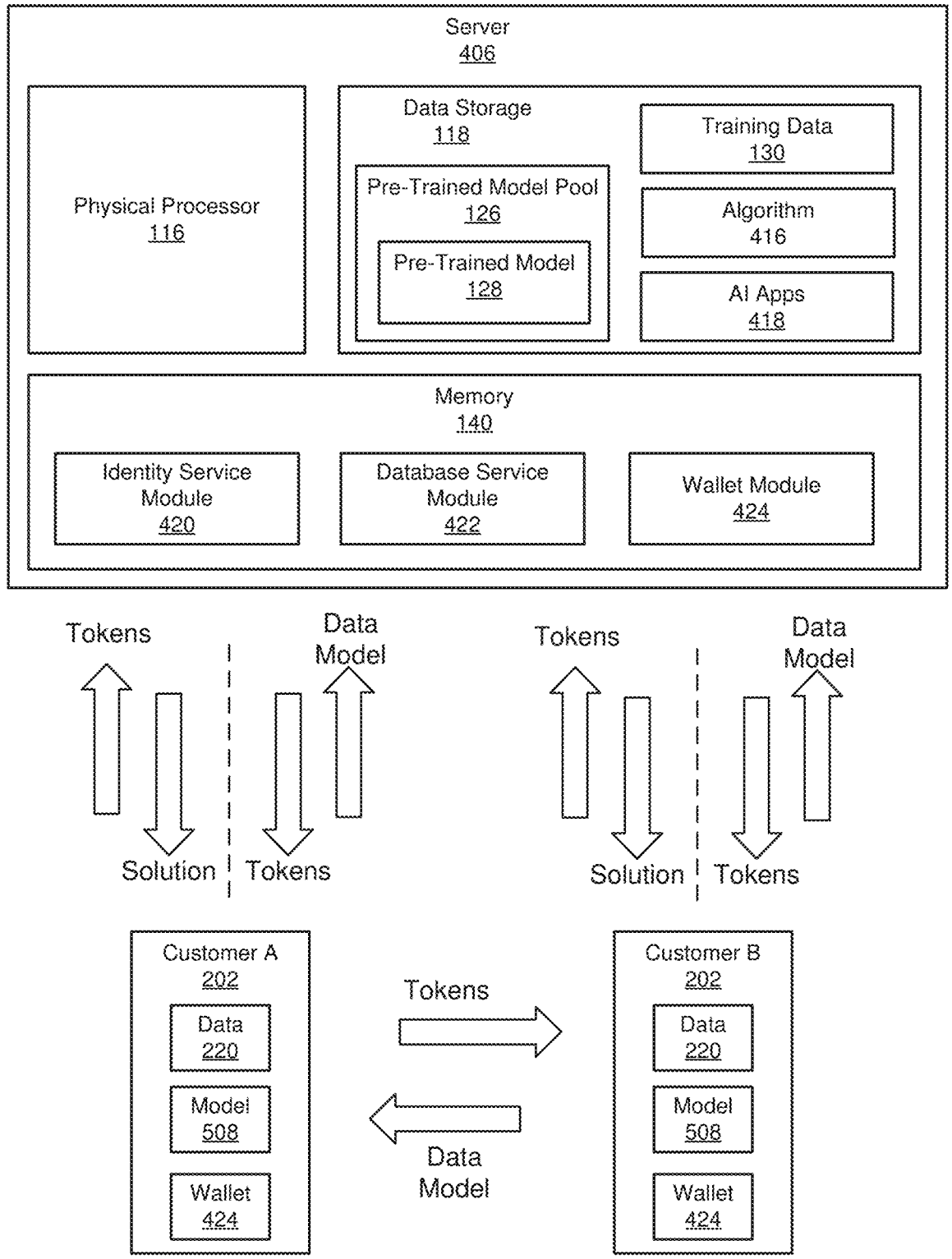
FIGS. 8-10 are block diagrams of embodiments disclosed herein having exemplary customer systems in communication with a server.

Referring to FIG. 8, when different entities utilizing AI technology train their respective models independently, the AI training can be enormously time-consuming and expensive. Most of the training involves deep learning architectures that use huge amounts of data to train the model with compatible accuracy. Most of the deep learning architectures prefer that the training data be annotated, and data annotation can also be costly and time-consuming. Despite these factors, in the past some entities have been reluctant to share their data with the public. The result has been different data providers expending resources to develop similar algorithms repeatedly, which is inefficient. In addition, it is time consuming to pass the data to the model training station and to train the model with limited computing resources typically available to individual entities.

For example, a steel manufacturer may use electronic-imaging-based defect detection to classify images of flat-product steel surfaces, such as cold strips, as they are produced in steel mills. The steel surfaces should be smooth, non-oxidized, and free of roll marks, holes, scratches, dark/black lines, heat buckles, rust/oxidation, slivers, scales, roll marks, oil spots, serrated edges, wrinkles, inclusions, shells, pimples, oxide scale, and lamination. An embodiment for automatic defect detection may comprise acquiring surface images of the cold-strips using one or more digital cameras, and then classifying the surface images using a classification model.

As another example, a home appliance distributor may use electronic-imaging-based defect detection to classify images of appliances, such as stoves, microwaves, and refrigerators, as they are received from manufacturers at the distributor's retail and warehouse locations. The appliance surfaces should be free of holes, scratches, dents, and oxidation. An embodiment for automatic defect detection may comprise acquiring surface images of the appliances using one or more digital cameras, and then classifying the surface images using a classification model.

Each of the automatic defect detection embodiments described above can include a respective classification model, which could be, for example, a convolutional neural network (CNN) classifier that has been "trained" using training data that includes surface images as well as indications as to whether each image includes a surface defect, and if so, the correct defect classification. The classification model can initially include tunable parameters for roughly mapping surface images to classification. An algorithm is then used to fine-tune, or "train," the model parameters using the training data that has inputs that are already mapped to respective classifications. Increasingly optimal values for the model parameters are learned as the model is fed with more and more training data. Thus, the process of building and training a model involves large amounts of training data, processing power, and time.

Embodiments of the systems and methods disclosed herein can provide for more secure, more transparent, and well-organized reward mechanism. In the server, users and miners can contribute their resources, including data, models, and computing power, in exchange for rewards.

As showed in FIG. 8, in some embodiments, when customers request a targeted model or a pre-trained model from the server, the customer will be expected to pay for the model. Various embodiments can include a variety of compensation and payment options, for example monetary (currency), bartering, or token-based systems where the customer either pays money, i.e., in an official currency), provides data or models as trade for receiving data or models, or the customer can submit tokens or the like that were previously received from the server in exchange for data or models submitted by the customer. Examples of what can be traded can include training data, target models, pre-training models, or previously-received tokens for private token/trade system. After they finish their training process, they can contribute their data as well as their AIMS. As a result, they can get compensated for their contributions, e.g., with virtual currency or tokens as rewards. One thing should be noticed is that the data or model owners do not need to worry about data security because of the blockchain technology that is used, i.e., storing the data in a distributed blockchain for data integrity.

Figure 9:
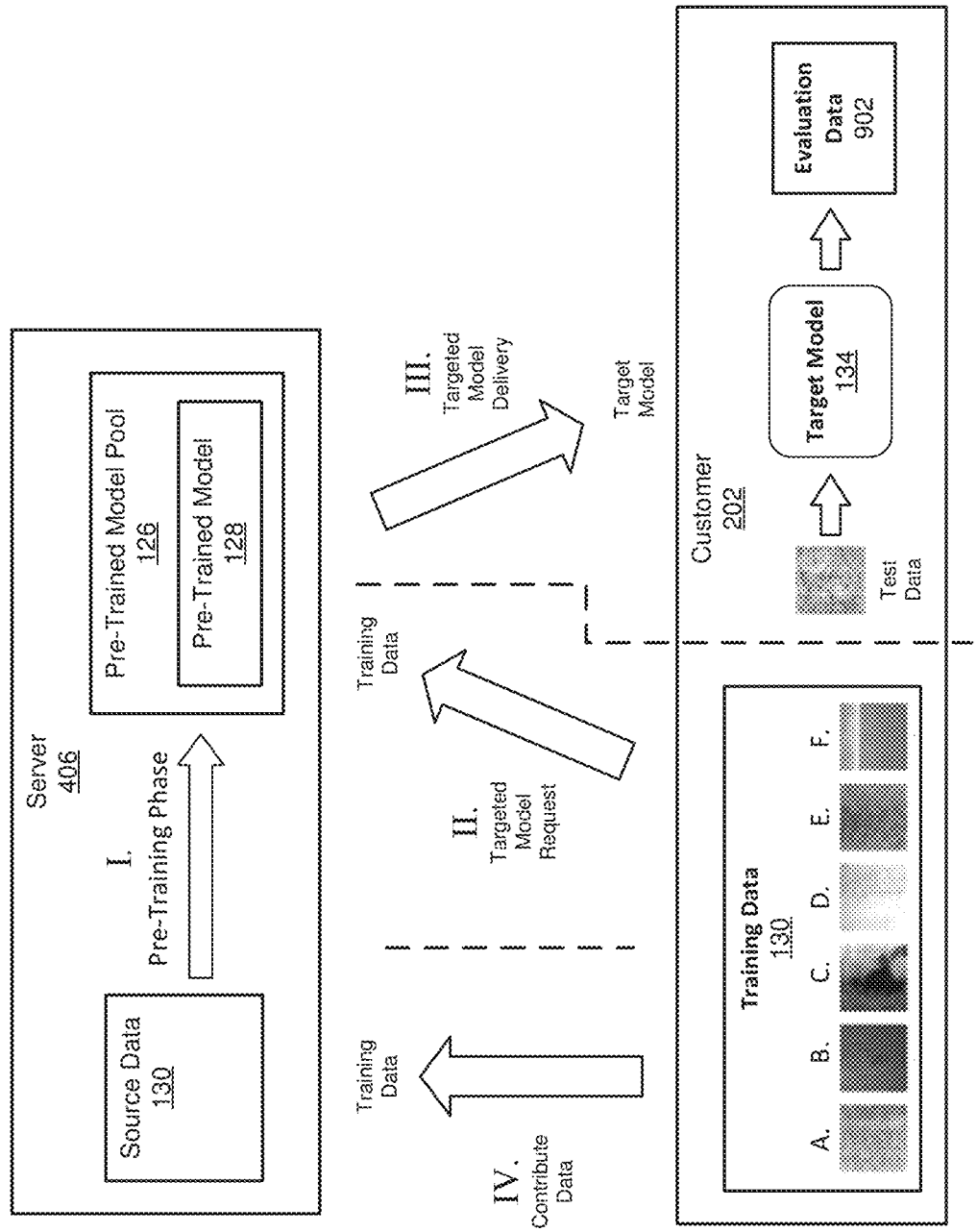

Referring to FIG. 9, embodiments of systems and methods disclosed herein can combine surface defect inspection with AI, making it easier to train the model from one field to another. Distributed AI framework collects a large amount of idle resources (computing power and storage) and extends a specific model to multiple different industries. Feedback and sharing mechanisms provides users from different industries with the chance to upload and share their dataset and models.

As shown in FIG. 9, embodiments of the systems and methods disclosed herein can include a reuse mechanism such that users who trained their model can upload their data and model, which can then be fed into a model pool to pre-train using the idle computing resources of the server. As such, embodiments of the systems and methods disclosed herein can include a server that allows for faster implementation of AI research results in industry because researchers can upload their models and data to the server, where engineers in the company are able to see and get them.

Figure 10:
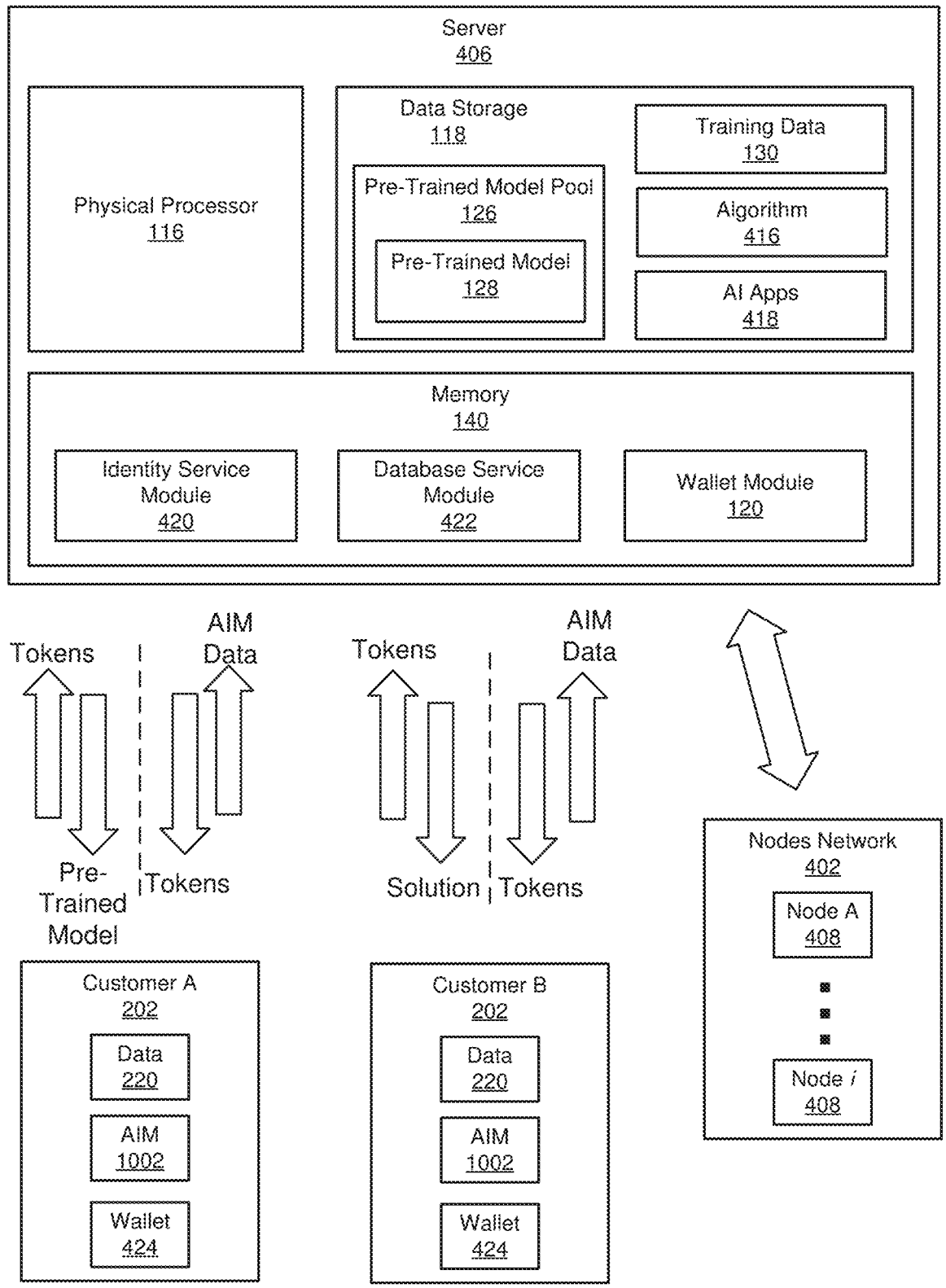

As shown in FIG. 10, customers 202 who hold AI mining machines (AIM) 1002 can make requests towards the server 406 for a pre-trained model 128 to effectively and efficiently train their own model. The pre-trained model 128 allows users to successfully and effectively train their own model with transfer learning technology, which means they can get the desired model with much less time and computing resources. After finishing their own model training, the customers 202 can upload their data 220, which may or may not include their trained model, to the server 406. Incoming data and models will be combined into the training data 130 and the pre-trained model pool 126. As the amount of training data 130 grows, pre-trained models 128 in the pre-trained model pool 126 will become more powerful and more accurate. Embodiments of the systems and methods disclosed herein can provide improved training accuracy by incorporating the ability to update models in real time as data is received from a multitude of users on an ongoing basis.

Embodiments of the systems and methods disclosed herein can also allow customers 202 to participate in the blockchain 414 (shown in FIG. 4) as nodes 408. On the server 406, customers can deploy their AI tasks and upload their models and data 220, both of which can be monitored and controlled by contributors based on blockchain technology.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for artificial-intelligence-based automated surface inspection, at least a portion of the method being performed by a computing device comprising at least one processor, the method comprising:
   receiving, by the one or more computing devices, from a third-party entity:
      customer data related to surface anomalies of objects in a first industry; and
      a request for a targeted model built from a pre-trained model and the data;
   retrieving, by the one or more computing devices, the pre-trained model from a pre-trained model pool, the pre-trained model having been built from training data related to objects in a second industry;
   generating, by the one or more computing devices, the targeted model from the pre-trained model and the customer data, the targeted model being related to mapping sensor data to surface anomalies; and
   providing, by the one or more computing devices, the targeted model to the third-party entity.

2. The computer-implemented method of claim 1, wherein the receiving from the third-party entity further comprises receiving compensation for the requested targeted model.

3. The computer-implemented method of claim 2, wherein the compensation includes an agreement to contribute at least one of the customer data and the targeted model to be available for other third-party entities.

4. The computer-implemented method of claim 2, wherein the compensation includes at least one of a fiat currency and a virtual currency.

5. The computer-implemented method of claim 1, further comprising updating, by the one or more computing devices, a distributed blockchain structure to include the at least one of the customer data and the targeted model.

6. The computer-implemented method of claim 1, wherein the generating, by the one or more computing devices, of the targeted model includes:
   transmitting the customer data and the pre-trained model to one or more of a plurality of networked nodes, and
   receiving the targeted model from one or more of the plurality of networked nodes.

7. The computer-implemented method of claim 6, wherein the generating, by the one or more computing devices, of the targeted model further includes transmitting compensation to one or more of the plurality of networked nodes for the targeted model, wherein the compensation includes at least one of a fiat currency and a virtual currency.

8. A system for artificial-intelligence-based automated surface inspection, the system comprising:
   a receiving module, stored in memory, that receives, from a third-party entity:
      customer data related to surface anomalies of objects in a first industry; and
      a request for a targeted model built from a pre-trained model and the data;
   a retrieving module, stored in memory, that retrieves the pre-trained model from a pre-trained model pool, the pre-trained model having been built from training data related to objects in a second industry;
   a generating module, stored in memory, that generates the targeted model from the pre-trained model and the customer data, the targeted model being related to mapping sensor data to surface anomalies;

a providing module, stored in memory, that provides the targeted model to the third-party entity; and at least one physical processor that executes the receiving module, the retrieving module, the generating module, and the providing module.

9. The system of claim 8, wherein the receiving module further receives compensation for the requested targeted model.

10. The system of claim 9, wherein the compensation includes an agreement to contribute at least one of the customer data and the targeted model to be available for other third-party entities.

11. The system of claim 9, wherein the compensation includes at least one of a fiat currency and a virtual currency.

12. The system of claim 8, further comprising an updating module that updates a distributed blockchain structure to include the at least one of the customer data and the targeted model, wherein the at least one physical processor further executes the updating module.

13. The system of claim 8, wherein the generating module is further configured for:

transmitting the customer data and the pre-trained model to one or more of a plurality of networked nodes, and receiving the targeted model from one or more of the plurality of networked nodes.

14. The system of claim 13, wherein the generating module is further configured for transmitting compensation to one or more of the plurality of networked nodes for the targeted model, wherein the compensation includes at least one of a fiat currency and a virtual currency.

15. A non-transitory computer-readable medium comprising one or more computer-executable instructions that, when executed by at least one processor of a computing device, cause the computing device to:

receive from a third-party entity:
customer data related to surface anomalies of objects in a first industry; and
a request for a targeted model built from a pre-trained model and the data;

retrieve the pre-trained model from a pre-trained model pool, the pre-trained model having been built from training data related to objects in a second industry;

generate the targeted model from the pre-trained model and the customer data, the targeted model being related to mapping sensor data to surface anomalies; and provide the targeted model to the third-party entity.

16. The non-transitory computer-readable medium of claim 15, further comprising one or more computer-executable instructions that, when executed by at least one processor of the computing device, cause the computing device to further receive, from the third-party entity, compensation for the requested targeted model.

17. The non-transitory computer-readable medium of claim 16, wherein the compensation includes at least one of:

a fiat currency;

a virtual currency; and an agreement to contribute at least one of the customer data and the targeted model to be available for other third-party entities.

18. The non-transitory computer-readable medium of claim 15, further comprising one or more computer-executable instructions that, when executed by at least one processor of the computing device, cause the computing device to further update a distributed blockchain structure to include the at least one of the customer data and the targeted model.

19. The non-transitory computer-readable medium of claim 15, wherein the generating, by the one or more computing devices, of the targeted model includes:

transmitting the customer data and the pre-trained model to one or more of a plurality of networked nodes, and receiving the targeted model from one or more of the plurality of networked nodes.

20. The non-transitory computer-readable medium of claim 19, further comprising one or more computer-executable instructions that, when executed by at least one processor of the computing device, cause the computing device to further transmit compensation to one or more of the plurality of networked nodes for the targeted model, wherein the compensation includes at least one of a fiat currency and a virtual currency.

* * * * *